(12) United States Patent
Liao et al.

(10) Patent No.: US 12,607,841 B2
(45) Date of Patent: Apr. 21, 2026

(54) MICROSCOPE AUTOMATIC FOCUSING METHOD, MICROSCOPE SYSTEM, MEDICAL DEVICE, AND STORAGE MEDIUM

(71) Applicant: TENCENT TECHNOLOGY (SHENZHEN) COMPANY LIMITED, Shenzhen (CN)

(72) Inventors: Jun Liao, Shenzhen (CN); Jianhua Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 934 days.

(21) Appl. No.: 17/745,571

(22) Filed: May 16, 2022

(65) Prior Publication Data

US 2022/0342195 A1 Oct. 27, 2022

Related U.S. Application Data

(63) Continuation of application No. PCT/CN2021/077828, filed on Feb. 25, 2021.

(30) Foreign Application Priority Data

Apr. 13, 2020 (CN) ........................ 202010284514.X

(51) Int. Cl.
*G02B 26/08* (2006.01)
*G02B 7/36* (2021.01)
(Continued)

(52) U.S. Cl.
CPC ............. *G02B 21/245* (2013.01); *G02B 7/36* (2013.01); *G02B 21/02* (2013.01); *G02B 21/18* (2013.01);
(Continued)

(58) Field of Classification Search
CPC ........ G02B 21/245; G02B 7/36; G02B 21/02; G02B 21/18; G02B 21/248; G02B 21/361;
(Continued)

(56) References Cited

U.S. PATENT DOCUMENTS

2008/0266652 A1 10/2008 Yazdanfar et al.
2009/0128897 A1* 5/2009 Liu ........................ G02B 21/06
359/368
(Continued)

FOREIGN PATENT DOCUMENTS

CN 104932092 A 9/2015
CN 107656364 A 2/2018
(Continued)

OTHER PUBLICATIONS

China National Intellectual Property Administration (CNIPA) Office Action 1 for 202010284514.X Dec. 1, 2020 9 Pages (including translation).
(Continued)

*Primary Examiner* — Euncha P Cherry
(74) *Attorney, Agent, or Firm* — Anova Law Group, PLLC

(57) ABSTRACT

A microscope system includes an objective lens, configured to gather a first light of a target sample to enter a first optical path, wherein the first light converges, at a beamsplitter, with a second light generated by an image projection module after entering the first optical path through a lens assembly; a beamsplitter assembly, configured to respectively separate and cast light in different optical paths; a camera assembly, configured to photograph the target sample in a microscope field of view, to photograph a clearly focused image through a first optical path by using the camera assembly; an auxiliary focusing device, configured to determine a focal
(Continued)

length matching the camera assembly; and a focusing device, configured to adjust a focal length of image light entering the camera assembly according to a defocus amount of a target sample image determined by the auxiliary focusing device.

17 Claims, 8 Drawing Sheets

(51) Int. Cl.
| | |
|---|---|
| *G02B 21/02* | (2006.01) |
| *G02B 21/18* | (2006.01) |
| *G02B 21/24* | (2006.01) |
| *G02B 21/36* | (2006.01) |
| *G02B 27/10* | (2006.01) |
| *G02B 27/14* | (2006.01) |

(52) U.S. Cl.
CPC ......... *G02B 21/248* (2013.01); *G02B 21/361* (2013.01); *G02B 27/106* (2013.01); *G02B 27/14* (2013.01)

(58) Field of Classification Search
CPC .... G02B 27/106; G02B 27/14; G02B 21/244; G02B 21/365; G02B 27/283; G02B 21/36
See application file for complete search history.

(56) References Cited

U.S. PATENT DOCUMENTS

| | | | |
|---|---|---|---|
| 2014/0152796 A1 | 6/2014 | Mitsuhiro et al. | |
| 2016/0124207 A1* | 5/2016 | Aizaki ................. | G02B 21/244 |
| | | | 359/369 |
| 2020/0209599 A1 | 7/2020 | Pannhoff et al. | |
| 2021/0373308 A1 | 12/2021 | Liao et al. | |
| 2021/0405340 A1 | 12/2021 | Liao et al. | |
| 2023/0350185 A1 | 11/2023 | Sakurai | |

FOREIGN PATENT DOCUMENTS

| | | | |
|---|---|---|---|
| CN | 108051897 A | 5/2018 | |
| CN | 108254853 A | 7/2018 | |
| CN | 108646396 A | 10/2018 | |
| CN | 110488479 A | 11/2019 | |
| CN | 110673325 A | 1/2020 | |
| CN | 110727093 A | 1/2020 | |
| CN | 111443476 A | 7/2020 | |
| CN | 111443477 A | 7/2020 | |
| JP | 2010078940 A | 4/2010 | |
| JP | 2012181341 A | 9/2012 | |

OTHER PUBLICATIONS

China National Intellectual Property Administration (CNIPA) Office Action 3 for 202010284514.X Mar. 17, 2022 9 Pages (including translation).

The World Intellectual Property Organization (WIPO) International Search Report for PCT/CN2021/077828 May 19, 2021 6 Pages (including translation).

Martin Stumpe, "An Augmented Reality Microscope for Cancer Detection," Google AI Blog, Apr. 16, 2018, , Retrieved from the Internet: URL: https://ai.googleblog.com/2018/04/an-augmented-reality-microscope.html, [retrieved on Apr. 28, 2022]. 4 pages.

L. Firestone et al., "Comparison of autofocus methods for automated microscopy," Cytometry 12(3), 195-206, 1991. 12 pages.

S. Yazdanfar et al."Simple and robust image-based autofocusing for digital microscopy," Optics express vol. 16, No. 12, 2008, pp. 8670-8677. 8 pages.

S. Jiang et al. "Transform- and multi-domain deep learning for single-frame rapid autofocusing in whole slide imaging," Biomedical optics express vol. 9, Issue 4, 2018, pp. 1601-1612. 12 pages.

J. Liao et al., "Single-frame rapid autofocusing for brightfield and fluorescence whole slide imaging," Biomedical optics express vol. 7, Issue 11, 2016, pp. 4763-4768. 6 pages.

J. Liao et al., "Rapid focus map surveying for whole slide imaging with continuous sample motion," Optics letters vol. 42, Issue 17, 2017. 4 pages.

Joel S. Silfies et al., "Nikon Perfect Focus System (PFS)," Nikon's MicorscopyU, Retrieved from the Internet: URL:https://www.microscopyu.com/applications/live-cell-imaging/nikon-perfect-focus-system, [retrieved on Apr. 28, 2022]. 3 pages.

Anonymous, "P-733.3 XYZ Piezo Nanopositioner," physikinstrumente.com, Retrieved from the Internet: URL: https://www.physikinstrumente.com/en/products/nanopositioning-piezo-flexure-stages/pifoc-objective-pinano-sample-scanners-for-microscopy/p-7333-xyz-piezo-nanopositioner-20125/, [retrieved on Apr. 28, 2022]. 11 pages.

Anonymous, "Motorized Microscope Focus Controller," THORLABS, Retrieved from the Internet: URL: https://www.thorlabs.com/newgrouppage9.cfm?objectgroup_id=5804, [retrieved on Apr. 28, 2022]. 2 pages.

Anonymous, "Piezo Objective Scanner," THORLABS, Retrieved from the Internet:URL: https://www.thorlabs.com/newgrouppage9.cfm?objectgroup_id=9862, [retrieved on Apr. 28, 2022]. 4 pages.

Anonymous, "P-721 PIFOC High-Precision Objective Scanner," physikinstrumente.com, Retrieved from the Internet: URL:https://www.physikinstrumente.com/en/products/nanopositioning-piezo-flexure-stages/pifoc-objective-pinano-sample-scanners-for-microscopy/p-721-pifoc-high-precision-objective-scanner-200350/, [retrieved on Apr. 28, 2022]. 8 pages.

China National Intellectual Property Administration (CNIPA) Office Action 1 for 202010284514.X Dec. 6, 2022 11 Pages (including translation).

China National Intellectual Property Administration (CNIPA) Office Action 2 for Application No. 202310437825.9 Dec. 18, 2025 8 Pages (including translation).

* cited by examiner

307

306

308

305

304

303

301

302

MICROSCOPE AUTOMATIC FOCUSING METHOD, MICROSCOPE SYSTEM, MEDICAL DEVICE, AND STORAGE MEDIUM

CROSS-REFERENCES TO RELATED APPLICATIONS

This application is a continuation application of PCT Patent Application No. PCT/CN2021/077828, filed on Feb. 25, 2021, which claims priority to Chinese Patent Application No. 202010284514.X, filed on Apr. 13, 2020, the entire contents of both of which are incorporated herein by reference.

FIELD OF THE TECHNOLOGY

The present disclosure relates to medical image processing technologies, and in particular, to a microscope automatic focusing method, a microscope system, a medical device, and a storage medium.

BACKGROUND OF THE DISCLOSURE

With the research and progress of the artificial intelligence technologies, the artificial intelligence technology has been researched in and applied to many fields. For example, in recent years, the augmented reality technology and artificial intelligence have been provided for use in a conventional optical microscope system. On a conventional optical microscope, images of a target sample are acquired by using a camera, and real-time images are analyzed with reference to a machine learning algorithm.

The camera's ability to acquire high-quality images is a guarantee for the accuracy of the algorithm of the foregoing augmented reality microscope. A defocused image of a sample loses a lot of important optical information. Therefore, it is particularly important to ensure that the camera can acquire an accurately focused image of a sample, to reduce an impact of an inaccurately focused microscope image on a model output effects.

SUMMARY

In this regard, embodiments of the present disclosure provide a microscope automatic focusing method, a microscope system, a medical device, and a storage medium. The technical solutions in the embodiments of the present disclosure are implemented in the following way.

An embodiment of the present disclosure provides a microscope system, including: an objective lens, configured to gather a first light of a target sample to enter a first optical path, wherein the first light converges, at a beamsplitter, with a second light generated by an image projection module after entering the first optical path through a lens assembly; a beamsplitter assembly, comprising at least one beamsplitter and configured to respectively separate and cast lights in different optical paths; a camera assembly, disposed in the first optical path, comprising a camera, and configured to photograph the target sample in a microscope field of view, to generate and output a focused image photographed through the first optical path; an auxiliary focusing device, comprising an auxiliary focusing light source and an auxiliary focusing camera, disposed in a second optical path, and configured to determine a focal length matching the camera assembly; and a focusing device, configured to adjust a focal length of image light entering the camera assembly according to a defocus amount of a target sample image determined by the auxiliary focusing device.

An embodiment of the present disclosure further provides a microscope automatic focusing method, including: obtaining a measurement sample photographed by using an auxiliary focusing camera in a second optical path of a microscope; calculating an image evaluation parameter according to the measurement sample photographed by the auxiliary focusing camera and an image evaluation standard corresponding to the measurement sample; searching a prestored calibration curve for a relationship between the image evaluation parameter and a defocus amount according to the image evaluation parameter, to determine a required defocus amount; and adjusting a focal length of image light entering a camera assembly according to the determined defocus amount, to photograph a clearly focused image by using the camera assembly through a first optical path.

An embodiment of the present disclosure further provides a medical device, including: a microscope system, a memory, and a processor, the microscope system being the microscope system provided in the foregoing embodiments, and the processor executing the following operations; the memory being configured to store executable instructions; and the processor being configured to perform the foregoing microscope automatic focusing method during execution of the executable instructions stored in the memory.

An embodiment of the present disclosure further provides a non-transitory computer-readable storage medium, storing executable instructions, the executable instructions, when executed by a processor, implementing the foregoing microscope automatic focusing method.

The embodiments of the present disclosure have the following beneficial effects:

In the embodiments of the present disclosure, an objective lens is configured to obtain light of a target sample, the light entering a first optical path and converging at a beamsplitter with light generated by an image projection module (e.g., image projection assembly 1111, lens 1115 and polarizer 1117) after entering the first optical path through a lens assembly; a beamsplitter assembly includes at least one beamsplitter and is configured to respectively separate and cast light in different optical paths; a lens group includes at least one lens and is configured to cast light generated during observation of the to-be-observed sample after the light enters different optical paths through the objective lens, to implement propagation of the light along different optical paths; an image projection assembly is disposed in an optical path corresponding to the light casted by the lens assembly and is configured to perform image enhancement processing on an image of the target sample; a camera assembly is disposed in the first optical path, the camera assembly includes a camera and is configured to photograph the target sample in a microscope field of view, to generate and output a clearly focused image photographed through the first optical path; an auxiliary focusing device includes an auxiliary focusing light source and an auxiliary focusing camera, is disposed in a second optical path, and is configured to determine a focal length matching the camera assembly; and a focusing device is configured to adjust a focal length of image light entering the camera assembly according to a defocus amount of a target sample image determined by the auxiliary focusing device. In this way, a focusing device can perform automatic focusing on the camera assembly of the microscope system, and the clearly focused image photographed through the first optical path is formed and output-ted, to save a focusing time of the microscope system and improve the focusing accuracy.

BRIEF DESCRIPTION OF THE DRAWINGS

To describe the technical solutions of the embodiments of the present disclosure or the related art more clearly, the following briefly introduces the accompanying drawings required for describing the embodiments or the related art. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following describes the present disclosure in further detail with reference to the accompanying drawings. The described embodiments are not to be considered as a limitation to the present disclosure. All other embodiments obtained by a person of ordinary skill in the art without creative efforts shall fall within the protection scope of the present disclosure.

In the following descriptions, the term "some embodiments" describes subsets of all possible embodiments, but it may be understood that "some embodiments" may be the same subset or different subsets of all the possible embodiments, and can be combined with each other without conflict.

Before the embodiments of the present disclosure are further described in detail, a description is made on nouns and terms in the embodiments of the present disclosure, and the nouns and terms in the embodiments of the present disclosure are applicable to the following explanations.

1). The expression "in response to" is used for indicating a condition or a status on which a to-be-performed operation depends. When the condition or the status is satisfied, one or more to-be-performed operations may be real-time or have a set delay. Unless otherwise specified, there is no chronological order between the plurality of to-be-performed operations.

2) Terminal: including but not limited to a common terminal and a dedicated terminal, where the common terminal maintains a persistent connection and/or a short connection to a transmit channel, and the dedicated terminal maintains a persistent connection to the transmit channel.

3) Client: a carrier implementing specific functions in a terminal, for example, a mobile client (an APP) is a carrier implementing specific functions in a mobile terminal, such as executing a function of performing payment and consumption and a function of purchasing financial products.

4) Objective lens device: a device including at least one lens combination, may be provided with a tube and configured to observe a magnified image of an object such as a cell.

5) Field of view: a range that can be observed when the magnified image of the cell in a smear is observed through the objective lens.

6) Computer aided diagnosis (CAD): used for assisting in finding lesions by using radiology, an image processing technology, and other possible physiological and biochemical means in combination with analysis and calculation of a computer, to improve the accuracy of diagnosis.

Figure 1:
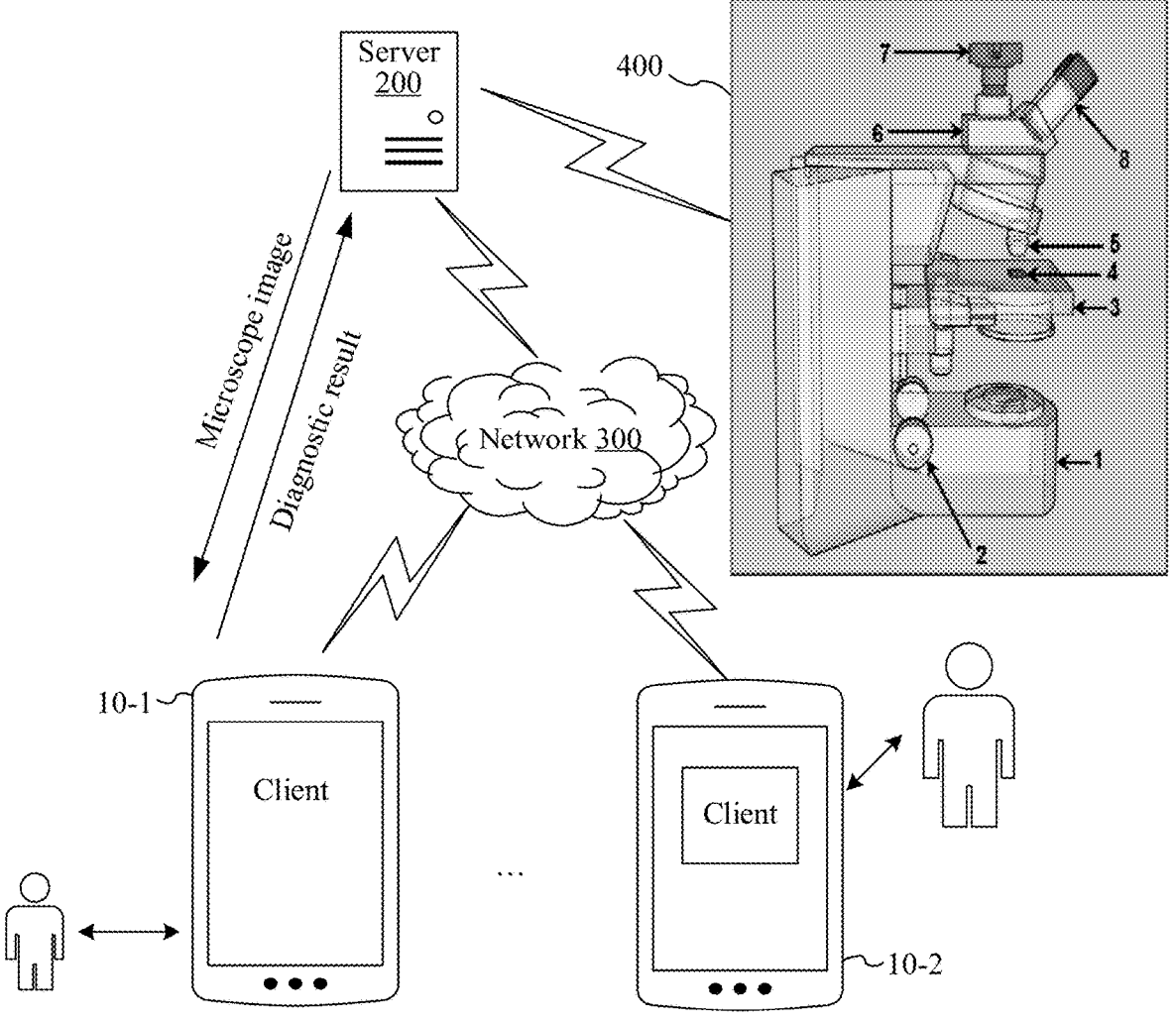
FIG. 1 is a schematic diagram of a use environment of a microscope automatic focusing method according to an embodiment of the present disclosure.

The following describes a microscope automatic focusing method provided in the present disclosure by using an example in which a corresponding lesion cell section is observed by using a microscope. FIG. 1 is a schematic diagram of a use environment of a microscope automatic focusing method according to an embodiment of the present disclosure. Referring to FIG. 1, a terminal (including a terminal 10-1 and a terminal 10-2) is equipped with corresponding clients that can perform different functions. The client obtains different section images to browse from a corresponding server 200 through a network 300 for the terminal (including the terminal 10-1 and the terminal 10-2). The terminal is connected to the server 200 through the network 300. The network 300 may be a wide area network, a local area network, or a combination of the two, and uses a wireless link to implement data transmission. Types of the section images obtained by the terminal (including the terminal 10-1 and the terminal 10-2) through the network 300 from the corresponding server 200 may be the same or different. For example, the terminal (including the terminal 10-1 and the terminal 10-2) may not only obtain a pathological image or a pathological video corresponding to a target object from the corresponding server 200 through the network 300, but also obtain a pathological section matching a current target object from the corresponding server 200 through the network 300 to browse. The server 200 may store section images respectively corresponding to different target objects, or may store auxiliary analysis information matching the section images of the target objects.

A neural network model in the field of artificial intelligence deployed by the server can analyze real-time images by using images of a target sample collected by using a camera on a conventional optical microscope with reference to a machine learning algorithm. Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result.

Specifically, AI is a comprehensive technology of computer science, which attempts to understand the essence of intelligence and produce a new type of intelligent machine that can react in a similar way to human intelligence. AI is to study the design principles and implementation methods of various intelligent machines, to enable the machines to have the functions of perception, reasoning, and decisionmaking. AI software technologies mainly include several major directions such as a computer vision technology, a speech processing technology, a natural language processing technology, and machine learning/deep learning.

A lesion of a patient observed under a microscope system (a medical device that is in contact with a pathological cell section of the target object) may include various kinds of different application scenarios such as lung cancer cell screening, early cervical cancer, and other different cell section screening. A microscope system image processing method based on this embodiment may be deployed to a plurality of application scenarios, thereby making it convenient for a doctor to remotely check and use.

The server 200 sends pathological information of a same target object to the terminal (the terminal 10-1 and/or the terminal 10-2) through the network 300, so that a user of the terminal (the terminal 10-1 and/or the terminal 10-2) analyzes the pathological information of the target object. Therefore, in an example, a corresponding neural network model deployed in the server 200 is configured to analyze clear image information outputted by a microscope system. The microscope system may obtain the image in the following manners: obtaining a measurement sample photographed by using an auxiliary focusing camera in a second optical path of a microscope; calculating a corresponding image evaluation parameter based on the measurement sample photographed by using the auxiliary focusing camera and a corresponding image evaluation standard; searching a prestored calibration curve for a relationship between the image evaluation parameter and a defocus amount according to the image evaluation parameter, and further determining a required defocus amount (e.g., according to the calibration curve); and adjusting a focal length of image light entering a camera assembly according to the determined defocus amount, to photograph a clearly focused image by using the camera assembly through a first optical path.

A target sample in a microscope field of view is photographed based on a result of focal length adjustment, and the clearly focused image photographed through the first optical path is formed and outputted.

Figure 2:
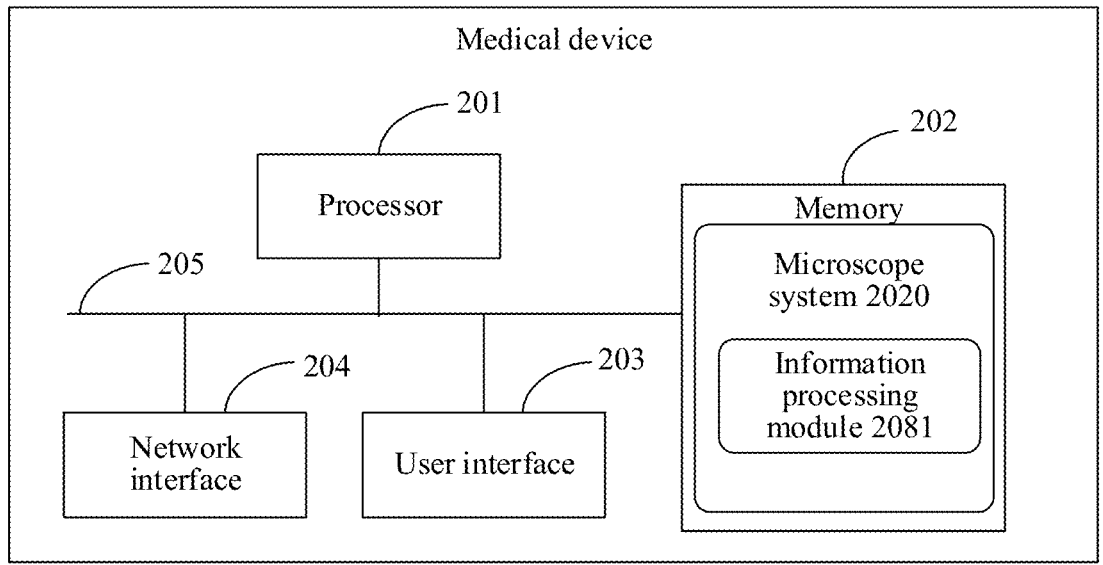
FIG. 2 is a schematic structural diagram of composition of a medical device according to an embodiment of the present disclosure.

The following describes a structure of the medical device according to this embodiment of the present disclosure in detail. The medical device may be implemented in various forms, for example, a dedicated terminal with a microscope system image processing function, a medical device, or a cloud server with a microscope system image processing function, such as the server 200 in FIG. 1. FIG. 2 is a schematic structural diagram of composition of a medical device 20 according to an embodiment of the present disclosure. It may be understood that, FIG. 2 shows only an exemplary structure rather than a complete structure of the medical device. The structure shown in FIG. 2 may be partially or completely implemented as required.

The medical device 20 provided in this embodiment of present disclosure includes: at least one processor 201, a memory 202, a user interface 203, and at least one network interface 204. All the components in the medical device 20 are coupled together by using a bus system 205. It may be understood that the bus system 205 is configured to implement connection and communication between these components. In addition to a data bus, the bus system 205 further includes a power bus, a control bus, and a status signal bus. However, for ease of clear description, all types of buses are labeled as the bus system 205 in FIG. 2.

The user interface 203 may include a display, a keyboard, a mouse, a track ball, a click wheel, a key, a button, a touch panel, a touchscreen, or the like.

It may be understood that, the memory 202 may be a volatile memory or a non-volatile memory, or may include both a volatile memory and a non-volatile memory. The memory 202 in this embodiment of the present disclosure can store data to support operation of the terminal (for example, 10-1). An example of the data includes any computer program configured to be operated on the terminal (for example, 10-1), for example, an operating system and an application program. The operating system includes various system programs, such as a framework layer, a kernel library layer, and a driver layer, which are configured to implement various basic services and process a task based on hardware. The application program may include various application programs.

In some embodiments, the microscope system provided in this embodiment of the present disclosure may be implemented by a combination of software and hardware. In an example, the microscope system provided in this embodiment of the present disclosure may be a processor in the form of a hardware decoding processor, and is programmed to perform the microscope system image processing method provided in the embodiments of the present disclosure. For example, the processor in the form of the hardware decoding processor may use one or more application specific integrated circuits (ASICs), digital signal processors (DSPs), programmable logic devices (PLDs), complex programmable logic devices (CPLDs), field-programmable gate arrays (FPGAs), or other electronic elements.

For example, the microscope system provided in this embodiment of the present disclosure is implemented by a combination of software and hardware. The microscope system provided in this embodiment of the present disclosure may be directly embodied as a combination of software modules executed by the processor 201. The software module may be located in a storage medium; the storage medium is located in the memory 202; and the processor 201 reads executable instructions included in the software module in the memory 202, and implements, in combination with necessary hardware (for example, including the processor 201 and another component connected to the bus 205), the microscope system image processing method provided in the embodiments of the present disclosure.

For example, the processor 201 may be an integrated circuit chip, and has a signal processing capability, for example, a general purpose processor, a digital signal processor (DSP), or another programmable logical device, a discrete gate, a transistor logical device, or a discrete hardware component. The general purpose processor may be a microprocessor, any conventional processor, or the like.

In an example in which the microscope system provided in this embodiment of the present disclosure is implemented by hardware, the device provided in this embodiment of the present disclosure may be directly executed by using the processor 201 in the form of a hardware decoding processor, for example, one or more ASICs, DSPs, PLDs, CPLDs, FPGAs, or other electronic elements, to execute the microscope system image processing method provided in this embodiment of the present disclosure.

The memory 202 in this embodiment of the present disclosure is configured to store various types of data to support operations of the medical device 20. Examples of the data include: any executable instruction configured to be operated on the medical device 20, such as executable instructions, and a program that implements the microscope system image processing method of the embodiments of the present disclosure may be included in the executable instructions.

In some other embodiments, the microscope system provided in this embodiment of the present disclosure may be implemented in the form of software. FIG. 2 shows a microscope system 2020 stored in the memory 202, which may be software in the form of a program, a plug-in, or the like, and include a series of modules. An example of the program stored in the memory 202 may include the microscope system 2020. The microscope system 2020 includes the following software modules:

an information processing module 2081, configured to obtain a measurement sample photographed by using an auxiliary focusing camera in a second optical path of a microscope, calculate a corresponding image evaluation parameter based on the measurement sample photographed by using the auxiliary focusing camera and a corresponding image evaluation standard, search a prestored calibration curve for a relationship between the image evaluation parameter and a defocus amount according to the image evaluation parameter, and further determine a required defocus amount, and adjust a focal length of image light entering a camera assembly according to the determined defocus amount, to photograph a clearly focused image by using the camera assembly through a first optical path.

Figure 3:
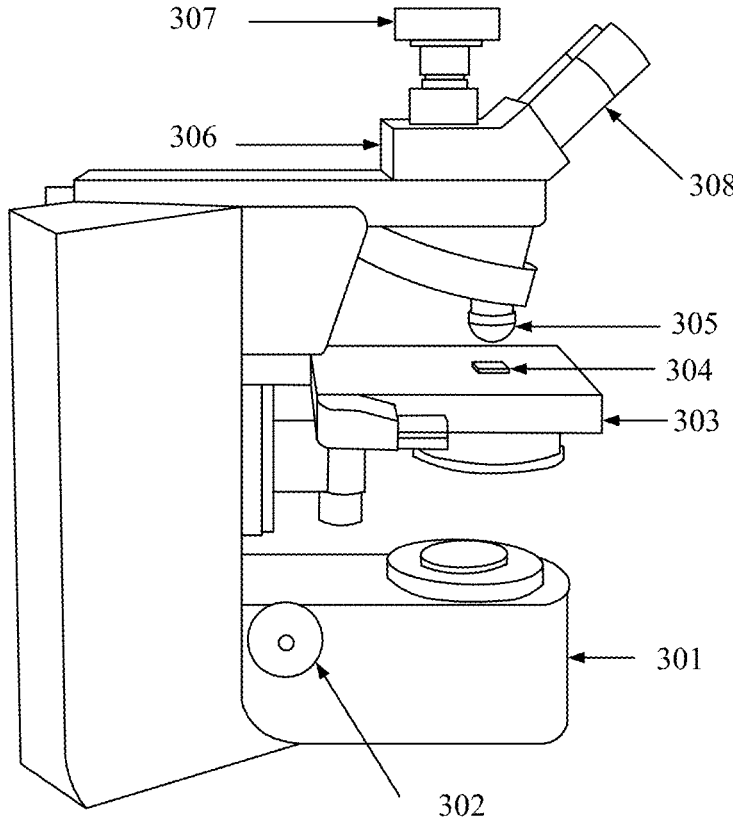
FIG. 3 is an example structure of a microscope system according to an embodiment of the present disclosure.

Before a microscope automatic focusing method provided in the present disclosure is introduced, a microscope focusing process in the related art is described firstly. FIG. 3 is an example structure of a microscope system in the related art in the present disclosure. A microscope 300 is provided in related embodiments, including a microscope body 301, microscope-body-stage focus adjustment knobs 302, a microscope body stage 303, a target sample 304 of the microscope, a body objective lens 305, a trinocular tube 306, a camera 307, and an eyepiece 308. The microscope body stage 303 is disposed above the microscope body 301. The target sample 304 is placed on the microscope body stage 303. The microscope-body-stage focus adjustment knobs 302 are disposed on two sides of the microscope body 301. The microscope body objective lens 305 is located above the microscope body stage 303, the trinocular tube 306 is further disposed above the microscope body objective lens 305, and the trinocular tube 306 is respectively connected to the camera 307 and the eyepiece 308. The microscope-body-stage focus adjustment knobs 302 can be adjusted to adjust the microscope body stage 303 to rise or fall in a vertical direction, so as to change a distance between the microscope body stage 303 and the microscope body objective lens 305 to implement focus adjustment. Certainly, the microscope body objective lens 305 may alternatively be moved, to change the distance between the microscope body stage 303 and the microscope body objective lens 305 to implement focus adjustment.

A premise of performing focus adjustment on the microscope 300 is an assumption that an end of the eyepiece 308 and an end of the camera 307 of the trinocular tube 306 of the microscope 300 are parfocal. However, an image at the end of the camera 307 and an image at the end of the eyepiece 308 are not parfocal due to a limitation on a focus adjustment technology. For example, objective lenses of different magnifications are not parfocalized well, eyes of different users of the microscope 300 have different diopters, and when the user of the microscope 300 changes, a new user does not have the consciousness of adjusting a diopter knob of the eyepiece 308 and instead, directly adjusts the body stage to refocus a sample. The foregoing reasons may all cause the image at the end of the eyepiece 308 and the image of the end of the camera 307 of the microscope 300 to be not parfocal. As a result, when the human eye sees a clear image, the camera 307 acquires a defocused image. Consequently, the correctness of an analysis result of an image algorithm cannot be ensured. In the field of microscope image automatic analysis, images with high quality collected by the camera are the guarantee of algorithm accuracy of an augmented reality microscope. A defocused image of a sample may lose a lot of important optical information for which a subsequent algorithm with a relatively strong computing capability cannot make up. Therefore, it is important to ensure that the camera can collect a clearly focused image of the sample.

Figure 4:
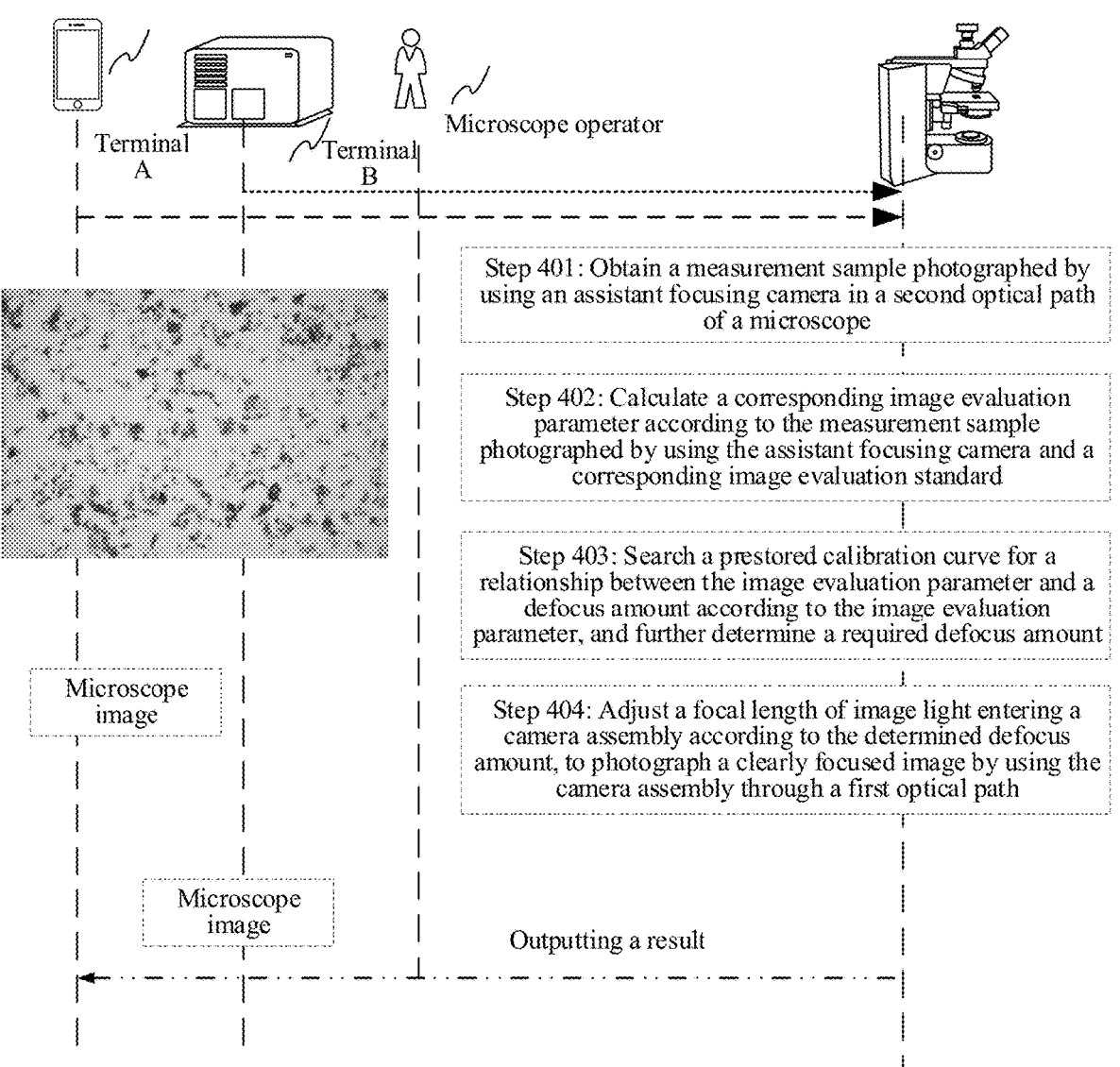
FIG. 4 is a schematic diagram of an example process of a microscope automatic focusing method according to an embodiment of the present disclosure.

To overcome the foregoing defects, FIG. 4 is an example schematic process diagram of a microscope automatic focusing method according to an embodiment of the present disclosure. The microscope automatic focusing method provided in the present disclosure includes the following steps:

Step 401: Obtain a measurement sample photographed by using an auxiliary focusing camera in a second optical path of a microscope.

Step 402: Calculate a corresponding image evaluation parameter according to the measurement sample photographed by using the auxiliary focusing camera and a corresponding image evaluation standard.

The image evaluation standard may be an offset of a relative pixel of a ghosting in an image collected by using the auxiliary focusing camera.

Step 403: Search a prestored calibration curve for a relationship between the image evaluation parameter and a defocus amount according to the image evaluation parameter, and further determine a required defocus amount.

The calibration curve may be prestored in a corresponding storage medium, so that an automatic focusing function of an augmented reality microscope may be implemented by invoking the calibration curve. The prestored calibration curve is a curve determined according to pre-collected images corresponding to different defocus amounts and corresponding image evaluation standards (for example, offsets of relative pixels of ghostings in the images collected by using the auxiliary focusing camera). Therefore, a relationship between the defocus amounts and image evaluation parameters with different defocus degrees may be determined by searching the calibration curve.

Step 404: Adjust a focal length of image light entering a camera assembly according to the determined defocus amount, to photograph a clearly focused image by using the camera assembly through a first optical path.

Through the automatic focusing method provided in this embodiment, when a focal length of image light entering a camera assembly is adjusted according to the determined defocus amount, a clearly focused image can be photographed by using the camera assembly through a first optical path regardless of whether a to-be-observed image shown in an eyepiece is clear, to avoid defects of slow manual focusing and poor precision in the prior art.

The following describes the microscope automatic focusing method provided in the present disclosure in combination with microscope systems in different forms. Structures of the microscope systems in different forms are different from that of the microscope shown in FIG. 3. For example, a target sample under a microscope can be conveniently and correctly observed by using an augmented reality microscope (ARM), and other augmented information can also be obtained, thereby helping an observer to position and quantify a feature that interests the observer. An example in which the augmented reality microscope is to be configured in only a medical diagnosis scenario is used. When observing a section with the ARM, a doctor can obtain a diagnostic result based on the section, that is, the augmented reality microscope can superimpose the diagnostic result as augmented reality information on the section, to facilitate the doctor to read the result within a field of view in real time. A neural network model run in a server can perform auxiliary diagnosis and treatment judgment on a patient region, to help the doctor to make correct judgment to pathological information of a lesion.

The following may continue to describe the structure of the microscope system provided in the present disclosure in combination with different states of the microscope system.

In some embodiments, the microscope system includes an objective lens, configured to gather a first light of a target sample to enter a first optical path, wherein the first light converges, at a beamsplitter, with a second light generated by an image projection module after entering the first optical path through a lens assembly; a beamsplitter assembly, comprising at least one beamsplitter and configured to respectively separate and cast lights in different optical paths; a camera assembly, disposed in the first optical path, comprising a camera, and configured to photograph the target sample in a microscope field of view, to generate and output a focused image photographed through the first optical path; an auxiliary focusing device, comprising an auxiliary focusing light source and an auxiliary focusing camera, disposed in a second optical path, and configured to determine a focal length matching the camera assembly; and a focusing device, configured to adjust a focal length of image light entering the camera assembly according to a defocus amount of a target sample image determined by the auxiliary focusing device.

In some embodiments, the microscope system further includes: the lens assembly, including at least one lens and configured to let the second light generated by the image projection module to pass through before entering the first optical path; an eyepiece and a trinocular tube, the eyepiece being sleeved with the trinocular tube and configured to observe the target sample through the objective lens; and an image projection assembly, disposed in an optical path corresponding to the second light, and configured to perform image enhancement processing on an image of the target sample. The trinocular tube is disposed on one end of the beamsplitter away from the objective lens, the trinocular tube includes at least two channels and a tube lens, the channels being located on one end away from the beamsplitter, one of the channels is in communication with the eyepiece, and the tube lens is located on one end close to the beamsplitter.

In some embodiments, the focusing device includes a drive assembly and a zoom lens, to photograph the target sample in the microscope field of view at different focal lengths.

In some embodiments, the beamsplitter assembly is respectively in communication with the objective lens and the tube lens of the trinocular tube, and the camera assembly is disposed in one of the channels of the trinocular tube; the beamsplitter assembly includes a beamsplitter, and the lens assembly includes a lens disposed between the beamsplitter and the image projection assembly; and the focusing device is located between the beamsplitter and the camera assembly and is configured to adjust the focal length of the image light entering the camera assembly according to the defocus amount of the target sample image determined by the auxiliary focusing device.

In some embodiments, the image projection assembly further includes a second polarizer, the second polarizer is located between a lens and the beamsplitter and is configured to perform polarization processing on light corresponding to the image projection assembly. The camera assembly further includes a first polarizer, the first polarizer is located between the focusing device and the beamsplitter and is configured to perform polarization processing on corresponding light collected by the camera assembly.

In some embodiments, the auxiliary focusing light source is disposed in a Fourier back focal plane corresponding to a condenser lens assembly of the microscope system and is configured to emit auxiliary focusing light, to form the second optical path. The beamsplitter assembly includes a beamsplitter that is disposed between the focusing device and the camera assembly and is configured to reflect light in the second optical path to the auxiliary focusing camera. The auxiliary focusing camera is disposed at an axial biasing position on a conjugate plane of the camera assembly and is configured to photograph an overlapped image matching the target sample in the microscope field of view based on the light in the second optical path.

In some embodiments, the auxiliary focusing light source is disposed in a Fourier back focal plane corresponding to a condenser lens assembly of the microscope system and is configured to emit auxiliary focusing light, to form the second optical path; and the auxiliary focusing camera is disposed opposite to the image projection assembly along the beamsplitter assembly and is configured to photograph an overlapped image matching the target sample in the microscope field of view based on light in the second optical path.

In some embodiments, the image projection assembly and the camera assembly run in a time division multiplexing mechanism.

In some embodiments, the microscope system further includes at least one output interface device, coupled with a data processing unit of the microscope system, to output the clearly focused image photographed through the first optical path and an image of the target sample after image enhancement processing.

In some embodiments, the objective lens includes at least one of: an achromatic objective lens, a planar achromatic objective lens, a planar semi-apochromatic objective lens, or a planar apochromatic objective lens. In some embodiments, the beamsplitter includes at least one of: a cube beamsplitter, a plate beamsplitter, or a pellicle beamsplitter.

Figure 5:
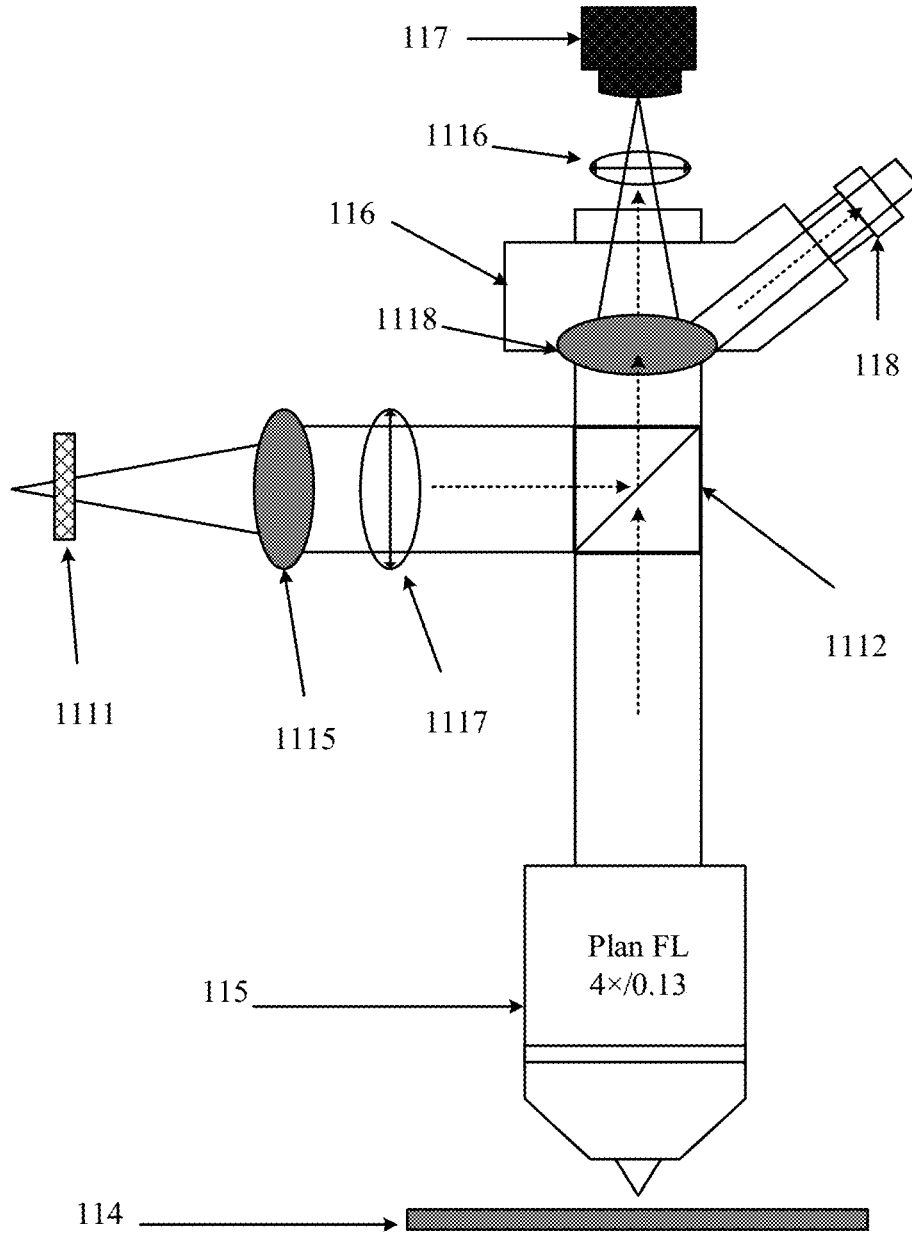
FIG. 5 is an example schematic structural diagram of a microscope system according to an embodiment of the present disclosure.

FIG. 5 is an example schematic structural diagram of a microscope system 1100 according to an embodiment of the present disclosure. The microscope system 1100 specifically includes an objective lens 115, a beamsplitter 1112, an image projection assembly 1111, a camera assembly 117, and a trinocular tube 116. The objective lens 115 includes a first end 10a and a second end 10b that are disposed opposite to each other, and the first end 10a faces a target sample. The beamsplitter 1112 is disposed on the second end 10b and the beamsplitter 1112 is respectively connected to the objective lens 115 and a tube lens 1118 of a multinocular tube. The camera assembly 117 is disposed in one of channels in the trinocular tube. The image projection assembly 1111 performs image projection in a corresponding field of view through light transmitted through a lens 1115. The camera assembly 117 receives light transmitted through the tube lens 1118, and the camera assembly 117 includes a camera and a corresponding image output device configured to transmit an image photographed in the corresponding field of view to a server, to process or recognize the image. The trinocular tube 116 is disposed on one end of the beamsplitter 1112 away from the objective lens 115 and the trinocular tube 116 includes at least two channels and the tube lens 1118, the at least two channels are located at one end away from the beamsplitter 1112, and the tube lens 1118 is located at one end close to the beamsplitter 1112. The camera assembly 117 receives light outputted by the beamsplitter 1112 through the tube lens 1118, to collect the image in the corresponding field of view.

In this process, because the camera assembly 117 and the image projection assembly 1111 are disposed at different positions, to avoid an impact during propagation of light, the image projection assembly 1111 further includes a second polarizer 1117. The second polarizer 1117 is located between the lens 1115 and the beamsplitter 1112 and is configured to perform polarization processing on the light corresponding to the image projection assembly 1111. The camera assembly further includes a first polarizer 1116. The first polarizer 1116 is located between the tube lens 1118 and the camera assembly 117 and is configured to perform polarization processing on the corresponding light collected by using the camera assembly 117.

Further, an optical path of the microscope system 1100 is that: light of the objective lens 115 is transmitted to the beamsplitter 1112, and the beamsplitter 1112 reflects a part of the light to the tube lens 1118 and transmits the part of the light to a photosensitive chip of the camera assembly 117 by using the first polarizer 1116. At the same time, the beamsplitter 1112 transmits a part of the light to the tube lens 1118 and reflects the part of the light to pass through the tube lens 1118 to reach the trinocular tube 116. The trinocular tube 116 transmits the light to an eyepiece 118, and an image of a target sample 114 may be observed by using the eyepiece 118. At the same time, light generated by the image projection assembly 1111 on which polarization processing is performed by the second polarizer 1117 along the lens 1115 cannot reach the camera assembly 117 under the action of the beamsplitter 1112 and the first polarizer 1116, and does not affect photographing of the camera assembly 117.

However, in this process, microscope observers with different diopters need to repeat tedious trinocular parfocal adjustment every time when changeably using microscope systems. The camera cannot perform autofocus autonomously, and cannot collect a clear image. Meanwhile, when a microscope user sees the clear image through the eyepiece, the camera collects a defocused image. As a result, the correctness of an analysis result of an image algorithm executed by the server cannot be ensured.

Figure 6:
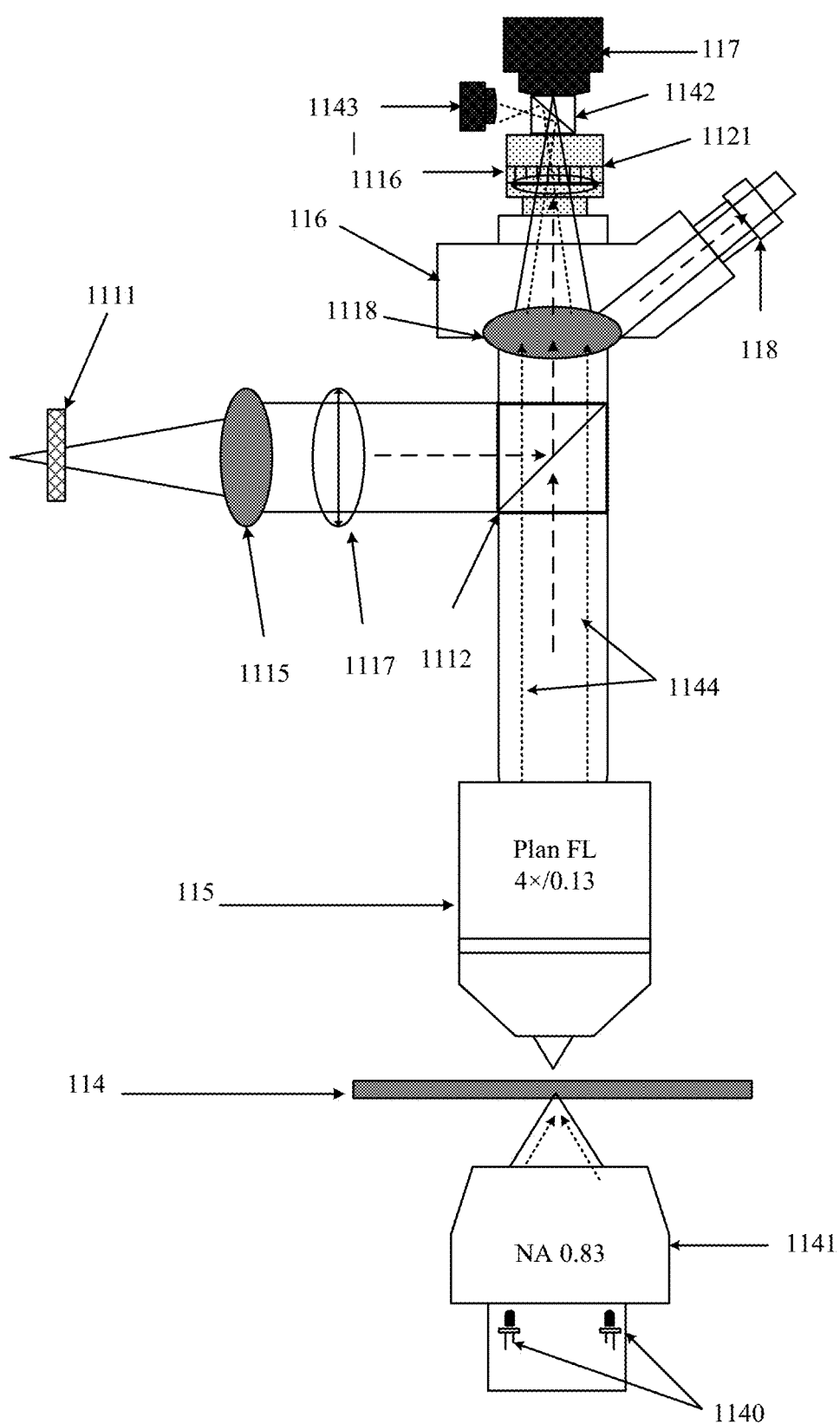
FIG. 6 is an example schematic structural diagram of a microscope system according to an embodiment of the present disclosure.

To solve the foregoing problem, further, FIG. 6 is an example schematic structural diagram of a microscope system 600 according to an embodiment of the present disclosure. The microscope system 600 specifically includes an objective lens 115, a beamsplitter 1112, an image projection assembly 1111, a camera assembly 117, and a trinocular tube 116. The objective lens 115 includes a first end 10a and a second end 10b that are disposed opposite to each other, and the first end 10a faces a target sample. The beamsplitter 1112 is disposed on the second end 10b and the beamsplitter 1112 is respectively connected to the objective lens 115 and a tube lens 1118 of a multinocular tube. The camera assembly 117 is disposed in one of channels in the trinocular tube. The image projection assembly 1111 performs image projection in a corresponding field of view through light transmitted through a lens 1115. The camera assembly 117 receives light transmitted by the tube lens 1118, and the camera assembly 117 includes a camera and a corresponding image output device configured to transmit an image photographed in the corresponding field of view, to process or recognize the image. The trinocular tube 116 is disposed on one end of the beamsplitter 1112 away from the objective lens 115 and includes at least two channels and the tube lens 1118, the channels are located at one end away from the beamsplitter 1112, and the tube lens 1118 is located at one end close to the beamsplitter 1112. The camera assembly 117 receives light outputted by the beamsplitter 1112 through the tube lens 1118, to collect the image in the corresponding field of view. Because the camera assembly 117 and the image projection assembly 1111 are disposed at different positions, to avoid an impact during propagation of light, the image projection assembly 1111 further includes a second polarizer 1117. The second polarizer 1117 is located between the lens 1115 and the beamsplitter 1112 and is configured to perform polarization processing on corresponding light in a first optical path. The camera assembly further includes a first polarizer 1116. The first polarizer 1116 is located between the tube lens 1118 and the camera assembly 117 and is configured to perform polarization processing on the corresponding light collected by using the camera assembly 117. Specifically, because a microscope operator wants to not only observe an image of a target sample 114, but also observe an image outputted by the image projection assembly 1111 with the naked eyes through an eyepiece 118, and it is expected that the camera assembly 117 can photograph only the image of the target sample 114, and ignore the image outputted by the image projection assembly 1111, light outputted by the image projection assembly 1111 may be converted into polarized light by using the second polarizer 1117, and the polarized light can directly reach the human eyes through the eyepiece 118 for observation. However, polarization directions of the first polarizer 1116 and the second polarizer 1117 are perpendicular to each other, and the first polarizer 1116 may remove the polarized light outputted by the second polarizer 1117, so that the camera assembly 117 may photograph only the image of the target sample 114.

In some embodiments of the present disclosure, the objective lens includes at least one of the following:

an achromatic objective lens, a planar achromatic objective lens, a planar semi-apochromatic objective lens, or a planar apochromatic objective lens. The beamsplitter includes at least one of the following: a cube beamsplitter, a plate beamsplitter, or a pellicle beamsplitter. Specifically, requirements for different magnifications during object observation are considered, for example, different magnifications are required for a same observed object such as an outline and an inner core of a cell or different magnifications are required for observed objects with different sizes. A combination of objective lenses with different magnifications may further be provided for the user to choose. For example, a combination of objective lenses with magnifications of 4.0×, 10.0×, 20.0×, 60.0× and 100.0× may be provided for the user to choose. In addition, the cube beamsplitter, the plate beamsplitter, or the pellicle beamsplitter may be selected and adapted according to a type of the augmented reality microscope, to adapt to different use environments.

In addition, to implement automatic focusing, the microscope system 1100 further includes an auxiliary focusing light source 1140 disposed in a Fourier back focal plane corresponding to a condenser lens assembly 1141 and configured to emit auxiliary focusing light. The auxiliary focusing light source 1140 may be two same infrared LED light emitters. An auxiliary focusing camera 1143 is disposed at an axial biasing position of a conjugate plane of the camera assembly 117, and a second optical path formed by light generated by the auxiliary focusing light source 1140 is shown in 1144 in the figure.

Further, optical paths of the microscope system 1100 include: the first optical path and the second optical path. The first optical path is configured to cast light after the light generated during observation of a target sample enter the optical path through the objective lens, so that the camera assembly photograph the target sample in a microscope field of view, to generate and output a clearly focused image photographed through the first optical path. In addition, the image projection assembly can further perform image enhancement processing on the image of the target sample by using light in the second optical path.

The first optical path includes that light of the objective lens 115 is transmitted to the beamsplitter 1112, and the beamsplitter 1112 reflects a part of the light to the tube lens 1118 and transmits the part of the light to a photosensitive chip of the camera assembly 117 through the first lens 1116. At the same time, the beamsplitter 1112 transmits a part of the light to the tube lens 1118 and reflects the transmitted light to pass through the tube lens 1118 to reach the trinocular tube 116. The trinocular tube 116 transmits the light to the eyepiece 118, and the image of the target sample 114 may be observed through the eyepiece 118. At the same time, light generated by the image projection assembly 1111 on which polarization processing is performed by the second polarizer 1117 along the lens 1115 cannot reach the camera assembly 117 under the action of the beamsplitter 1112 and the first polarizer 1116, so that the camera assembly 117 can photograph only the image of the target sample 114 without affecting photographing of the camera assembly 117. Polarization directions of the first polarizer 1116 and the second polarizer 1117 are perpendicular to each other. Before the camera assembly 117 collects images in a corresponding field of view, a focal length of the camera assembly 117 needs to be adjusted firstly. A corresponding defocus parameter may be specifically determined by using an image in the second optical path.

The second optical path includes that light of the auxiliary focusing light source 1140 in the Fourier back focal plane passes through the objective lens 115 and reaches the beamsplitter 1112. The beamsplitter 1112 transmits the light to the tube lens 1118, and finally an image (a partially overlapped image) is formed at the auxiliary focusing camera 1143 after infrared light emitted by an infrared LED as the auxiliary focusing light source is transmitted to the auxiliary focusing camera 1143 through the tube lens 1118 and beamsplitter 1142.

Further, in some embodiments of the present disclosure, a focusing device 1121 is located between the beamsplitter 1112 and the camera assembly 117 and is configured to drive a first lens to adjust a focal length based on a focal length determined according to a defocus amount of the overlapped image, to form a new focal length. Specifically, the focusing device 1121 may be an electric motor such as an ultrasonic drive motor or another mechanical motor that may be configured to correspondingly drive a lens group, or may be a liquid zoom lens, which is independent of the lens group and performs liquid zooming, to adapt to different use environments.

In some embodiments of the present disclosure, the focusing device 1121 is located between the beamsplitter 1112 and the camera assembly 117 and is configured to adjust, by using a zoom lens, a focal length based on a focal length determined according to a defocus amount of the overlapped image, to form a new focal length. The camera assembly 117 is configured to photograph the target sample in the microscope field of view based on the new focal length, to generate and output the clearly focused image photographed through the first optical path.

In some embodiments of the present disclosure, considering that camera interfaces may not be uniform, in order to be compatible with a plurality of cameras, or to expand or narrow the field of view, the camera may be used in cooperation with a camera adapter. A camera with a photosensitive chip is connected to a camera interface on the top of a trinocular tube through the camera adapter, to connect the camera and the trinocular tube. The camera adapter may further include an embedded polarizer. The embedded polarizer may filter out light whose polarization state is perpendicular to the polarizer, to avoid interfering with imaging.

Figure 7:
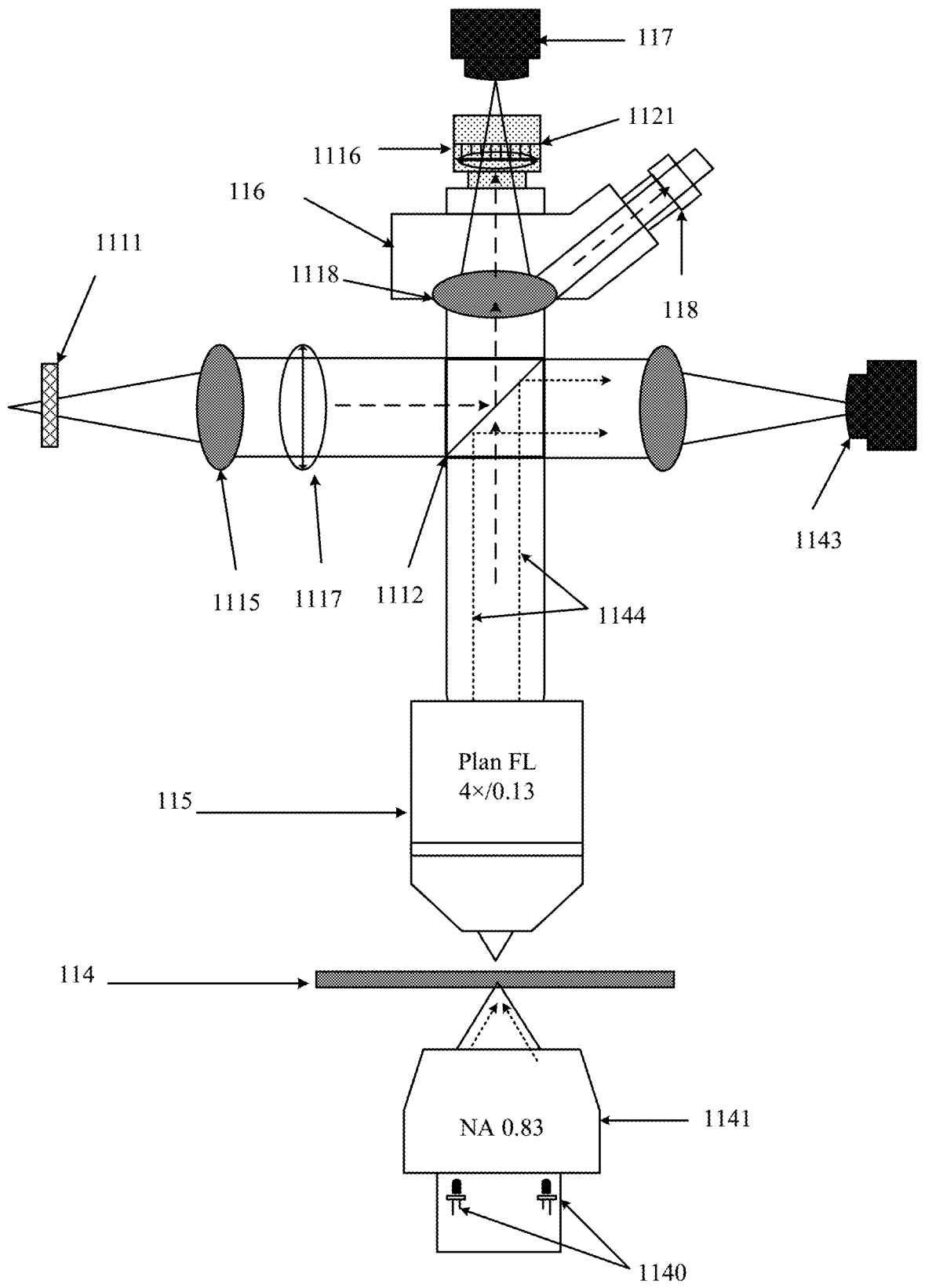
FIG. 7 is an example schematic structural diagram of a microscope system according to an embodiment of the present disclosure.

FIG. 7 is an example schematic structural diagram of a microscope system 700 according to an embodiment of the present disclosure. The microscope system 700 specifically includes an objective lens 115, a beamsplitter 1112, an image projection assembly 1111, a camera assembly 117, and a trinocular tube 116. The objective lens 115 includes a first end 10a and a second end 10b that are disposed opposite to each other, and the first end 10a faces a target sample. The beamsplitter 1112 is disposed on the second end 10b and the beamsplitter 1112 is respectively connected to the objective lens 115 and a tube lens 1118 of a multinocular tube. The camera assembly 117 is disposed in one of channels in the trinocular tube. The image projection assembly 1111 performs image projection in a corresponding field of view through light transmitted through a lens 1115. The camera assembly 117 receives light transmitted by the tube lens 1118, and the camera assembly 117 includes a camera and a corresponding image output device configured to transmit an image photographed in the corresponding field of view to a server, to process or recognize the image. The trinocular tube 116 is disposed on one end of the beamsplitter 1112 away from the objective lens 115 and the trinocular tube 116 includes at least two channels and the tube lens 1118, the channels are located at one end away from the beamsplitter 1112, and the tube lens 1118 is located at one end close to the beamsplitter 1112. The camera assembly 117 receives light outputted by the beamsplitter 1112 through the tube lens 1118, to collect the image in the corresponding field of view. Because the camera assembly 117 and the image projection assembly 1111 are disposed at different positions, to avoid an impact during propagation of light, the image projection assembly 1111 further includes a second polarizer 1117. The second polarizer 1117 is located between the lens 1115 and the beamsplitter 1112 and is configured to perform polarization processing on corresponding light in a first optical path. The camera assembly further includes a first polarizer 1116. The first polarizer 1116 is located between the tube lens 1118 and the camera assembly 117 and is configured to perform polarization processing on the corresponding light collected by using the camera assembly 117. Specifically, because a microscope operator wants to not only observe an image of a target sample 114, but also observe an image outputted by the image projection assembly 1111 with the naked eyes through an eyepiece 118, and it is expected that the camera assembly 117 can photograph only the image of the target sample 114, and ignore the image outputted by the image projection assembly 1111, light outputted by the image projection assembly 1111 may be converted into polarized light by using the second polarizer 1117, and the polarized light can directly reach the human eyes through the eyepiece 118 for observation. However, polarization directions of the first polarizer 1116 and the second polarizer 1117 are perpendicular to each other, and the first polarizer 1116 may remove the polarized light outputted by the second polarizer 1117, so that the camera assembly 117 may photograph only the image of the target sample 114.

In addition, to implement automatic focusing, the microscope system 1100 further includes an auxiliary focusing light source 1140 disposed in a Fourier back focal plane corresponding to a condenser lens assembly 1141 and configured to emit auxiliary focusing light. The auxiliary focusing light source 1140 may be two same infrared LED light emitters. An auxiliary focusing camera 1143 is disposed at a horizontally symmetrical position of the image projection assembly 1111 and receives light in a second optical path refracted by the beamsplitter 1112 through the lens 1119, and the second optical path formed by light generated by the auxiliary focusing light source 1140 is shown in 1144 in the figure.

Further, optical paths of the microscope system 1100 include the first optical path and the second optical path. The first optical path includes that light of the objective lens 115 is transmitted to the beamsplitter 1112, and the beamsplitter 1112 reflects a part of the light to the tube lens 1118 and transmits the part of the light to a photosensitive chip of the camera assembly 117 through a first lens 1116. At the same time, the beamsplitter 1112 transmits a part of the light to the tube lens 1118 and reflects the transmitted light to pass through the tube lens 1118 to reach the trinocular tube 116. The trinocular tube 116 transmits the light to an eyepiece 118, and the image of the target sample 114 may be observed by using the eyepiece 118. At the same time, light generated by the image projection assembly 1111 on which polarization processing is performed by the second polarizer 1117 along the lens 1115 cannot reach the camera assembly 117 under the action of the beamsplitter 1112 and the first polarizer 1116, polarization direction of the first polarizer 1116 and the second polarizer 1117 being perpendicular to each other, so that the camera assembly 117 may photograph only the image of the target sample 114 and the light outputted by the image projection assembly 1111 may not affect photographing of the camera assembly 117. In addition, the microscope operator wants to not only observe the image of the target sample 114, but also observe the image outputted by the image projection assembly 1111 with the naked eyes by using the eyepiece 118. Before the camera assembly 57 collects images in a corresponding field of view, a focal length of the camera assembly 117 needs to be adjusted firstly. A corresponding defocus parameter may be specifically determined by using an image in the second optical path.

The second optical path includes that light of the auxiliary focusing light source 1140 in the Fourier back focal plane passes through the objective lens 115 and reaches the beamsplitter 1112. The beamsplitter 1112 transmits the light to the lens 1119, and finally an image (a partially overlapped image) is formed at the auxiliary focusing camera 1143 after infrared light emitted by an infrared LED as the auxiliary focusing light source is transmitted to the auxiliary focusing camera 1143 through the lens 1119.

Further, in some embodiments of the present disclosure, a focusing device 1121 is located between the beamsplitter 1112 and the camera assembly 117 and is configured to drive a first lens to adjust a focal length based on a focal length determined according to a defocus amount of the overlapped image, to form a new focal length.

In some embodiments of the present disclosure, the focusing device 1121 is located between the beamsplitter 1112 and the camera assembly 117 and is configured to adjust, by using a zoom lens, a focal length based on a focal length determined according to a defocus amount of the overlapped image, to form a new focal length. The camera assembly 117 is configured to photograph the target sample in the microscope field of view based on the new focal length, to generate and output the clearly focused image photographed through the first optical path.

Figure 8:
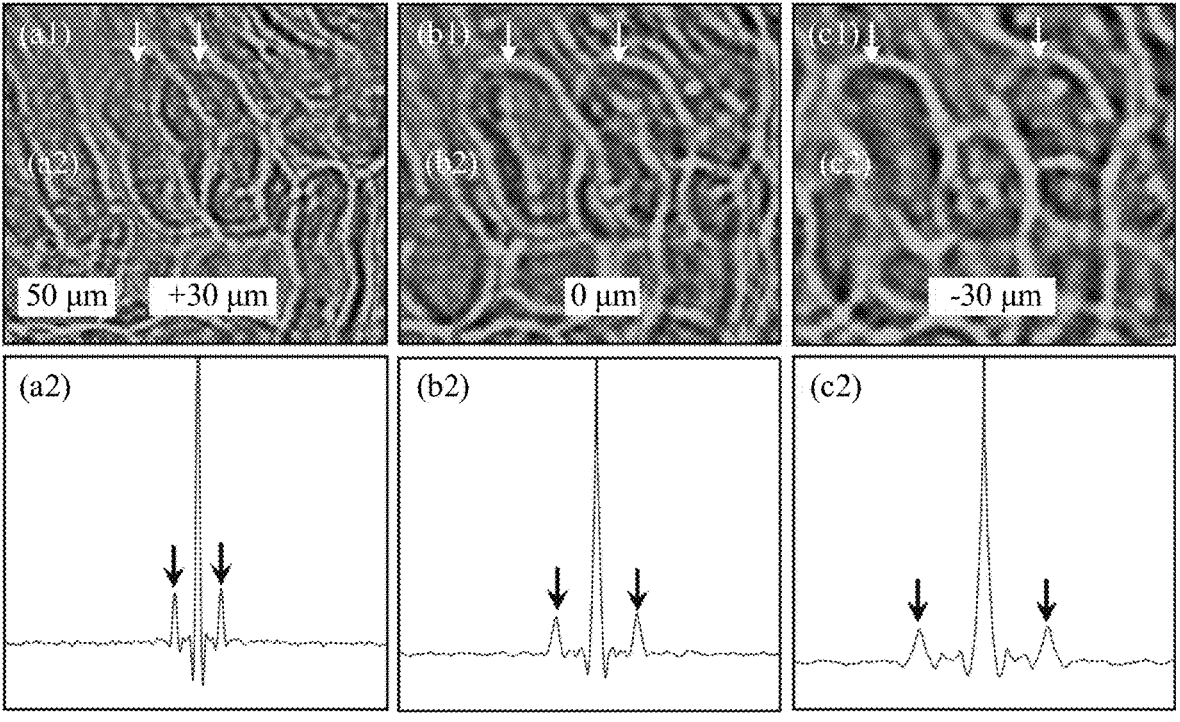
FIG. 8 is a schematic diagram of a relationship between a defocus amount and a distance between ghostings according to an embodiment of the present disclosure.

The following may continue to describe the microscope automatic focusing method provided in the present disclosure in combination with the method shown in FIG. 3 and the microscope systems in different forms shown in FIG. 5 to FIG. 7. FIG. 8 is a schematic diagram of a relationship between a defocus amount and a distance between ghostings according to an embodiment of the present disclosure. An image (a partially overlapped image) is formed at the auxiliary focusing camera 1143 after infrared light emitted by an infrared LED as the auxiliary focusing light source is transmitted to the auxiliary focusing camera 1143. The auxiliary focusing camera may be an ordinary industrial camera without an infrared filter or may be a dedicated infrared camera, which can capture infrared light. A camera in the camera assembly is usually a color camera, and there is an infrared cutoff filter in front of the color camera. Therefore, infrared light generated by an infrared light LED 40 is not captured by the camera. Certainly, an extra infrared cutoff filter may be added in the front of the camera to achieve a batter effect of filtering out the infrared light.

In a case of different defocus amounts, a peak value position of an autocorrelation result obtained after an autocorrelation operation is performed on an image collected by the auxiliary focusing camera will change.

It may be derived from the theory shown below:

It is assumed that the image collected by the auxiliary focusing camera is $z[x]=s[x]+s[x-x0]$, where $s[x]$ and $s[x-x0]$ are two ghostings with a distance therebetween of $x0$. $z[x]$ may alternatively be expressed as: $z[x]=s[x]*h[x]$, and $*$ represents a convolution symbol, and $h[x]=\delta[x]+\delta[x-x0]$.

$R(z[x])=R(s[x])*R(h[x])=R(s[x])*(2\delta[x]+\delta[x-x0]+\delta[x+x0])$ is obtained by performing an autocorrelation operation on $z[x]$. $R(\ )$ represents a symbol of the autocorrelation operation. $2\delta[x]+\delta[x-x0]+\delta[x+x0]$ represent three $\delta$ functions. $R(s[x])*(2\delta[x]+\delta[x-x0]+\delta[x+x0])$ represents a convolution between $R(s[x])$ and the three $\delta$ functions, which also means that three spikes are formed in a result of $R(s[x])$ through an algorithm operation. The highest spike is located in the middle, and the other two spikes are located at two sides of the highest spike and are respectively $x0$ away from the highest spike. In this case, it also means that if a distance between any two of the three spikes formed through the algorithm operation can be determined as $x0$, $x0$ is a distance between the two ghostings collected by the camera.

The microscope automatic focusing method provided in the present disclosure is still described by using an example of observation of a section of mouse kidney through a microscope. FIG. 5 is sample ghostings formed by two infrared LEDs 40 on a surface of the auxiliary focusing camera (a screenshot of the section of the mouse kidney under a 20× objective lens is shown in the figure).

Still referring to FIG. 8, focus images of the section of the mouse kidney in a corresponding field of view collected by the auxiliary focusing camera at different defocus amounts are shown in (a1), (b1), and (c1). (a2), (b2), and (c2) are respectively results of autocorrelation operations corresponding to (a1), (b1), and (c1).

(a1) to (c1) in FIG. 8 respectively show infrared images including two ghostings collected by the auxiliary focusing camera in the microscope system in the foregoing different embodiments. When a sample is at different defocus amounts, distances between two ghostings are different. A curve of a relationship between a defocus amount of a sample and a distance between two ghostings is obtained through operations (including but not limited to the auto-correlation operation) on images collected by the auxiliary focusing camera. Therefore, a fitting curve may be used as a reference table of the following focusing process, to implement automatic focusing.

Figure 9:
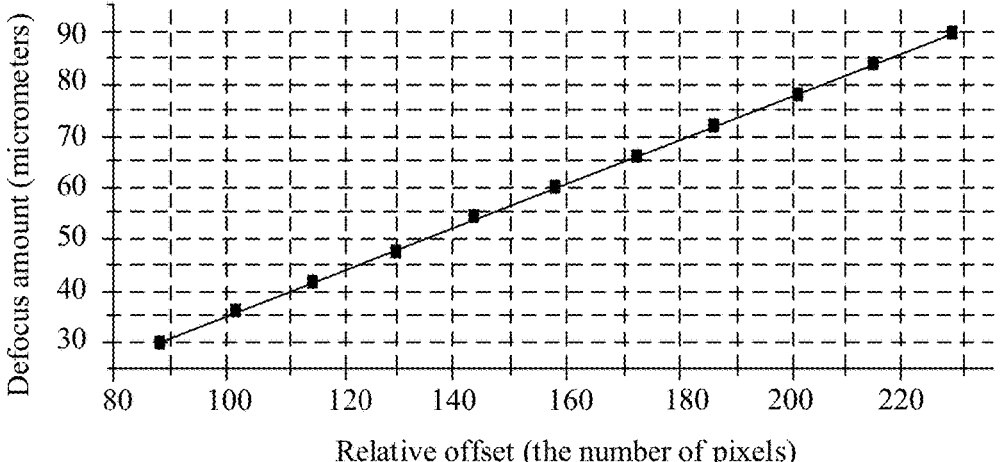
FIG. 9 is a schematic diagram of fitting of a relationship between a defocus amount and a distance between ghostings according to the present disclosure.

Still referring to FIG. 9, FIG. 9 is a schematic diagram of fitting of a relationship between a defocus amount and a distance between ghostings. A schematic diagram of a curve obtained after the relationship between the defocus amount and the distance between the ghostings is fitted is shown in FIG. 9. The curve is a fitting curve of a relationship between a defocus amount of a sample and a ghosting of an image collected by an auxiliary focusing camera.

In FIG. 9, the reason for a monotonically increasing trend shown in the curve is that a specific offset is set by the auxiliary focusing camera relative to the camera assembly. The offset in the figure is 60 micrometers, just as a sixth point in the most center in the figure. FIG. 9 shows a curve obtained by fitting 11 images with ghostings collected from a defocus amount from −30 micrometers (at 30 micrometers in FIG. 9, that is, a first point) to +30 micrometers (at 90 micrometers in FIG. 9, that is, a 11th point). The reason for setting the offset is that if the offset is not set, the fitting curve may be theoretically close to a "V" shape. However, when the defocus amounts of the sample are close, the distance between the two ghostings is short. The distances among the three spikes are very close according to the foregoing autocorrelation calculation method. Consequently, a value of a spike may be overwhelmed or a new unexpected and uncorrelated peak value will appear. This is not conducive to find a peak value position that needs to be determined. Therefore, the offset is introduced to extend the distances among the three peak values.

Different indicator information needs to be fitted as a curve, and an apex of the curve is a position corresponding to zero defocus amount. When the defocus amount is closer to zero, it indicates that the image is clearer, and the focusing device drives the camera to a position that needs to be adjusted.

Beneficial Technical Effects:

In the embodiments of the present disclosure, a measurement sample photographed by using an auxiliary focusing camera in a second optical path of a microscope is obtained; a corresponding image evaluation parameter is calculated based on the measurement sample photographed by using the auxiliary focusing camera and a corresponding image evaluation standard; a prestored calibration curve is searched for a relationship between the image evaluation parameter and a defocus amount according to the image evaluation parameter and a required defocus amount is further determined; and a focal length of image light entering a camera assembly is adjusted according to the determined defocus amount, to photograph a clearly focused image by using the camera assembly through a first optical path. In this way, a focusing device can perform automatic focusing on the camera assembly of the microscope system, and the clearly focused image photographed through the first optical path is formed and outputted, to save a focusing time of the microscope system and improve the focusing accuracy.

The foregoing descriptions are merely preferred embodiments of the present disclosure, but are not configured to limit the present disclosure. Any modification, equivalent replacement and improvement made within the spirit and principle of the present disclosure shall fall within the protection scope of the present disclosure.

In the embodiments of the present disclosure, a measurement sample photographed by using an auxiliary focusing camera in a second optical path of a microscope is obtained; a corresponding image evaluation parameter is calculated based on the measurement sample photographed by using the auxiliary focusing camera and a corresponding image evaluation standard; a prestored calibration curve is searched for a relationship between the image evaluation parameter and a defocus amount according to the image evaluation parameter and a required defocus amount is further determined; and a focal length of image light entering a camera assembly is adjusted according to the determined defocus amount, to photograph a clearly focused image by using the camera assembly through a first optical path. In this way, a focusing device can perform automatic focusing on the camera assembly of the microscope system, and the clearly focused image photographed through the first optical path is formed and outputted, to save a focusing time of the microscope system and improve the focusing accuracy, so that a user of the microscope system obtains a clearer image.

What is claimed is:

1. A microscope system, comprising:
   an objective lens, configured to gather a first light of a target sample to enter a first optical path, wherein the first light converges, at a beamsplitter, with a second light generated by an image projection module after entering the first optical path through a lens assembly;
   a beamsplitter assembly, comprising the beamsplitter and configured to respectively separate and cast lights in different optical paths;
   a camera assembly, disposed in the first optical path, comprising a camera, and configured to photograph the target sample in a microscope field of view, to generate and output a focused image photographed through the first optical path;
   an auxiliary focusing device, comprising an auxiliary focusing light source and an auxiliary focusing camera, disposed in a second optical path, and configured to determine a focal length matching the camera assembly; and
   a focusing device, configured to adjust a focal length of image light entering the camera assembly according to a defocus amount of a target sample image determined by the auxiliary focusing device.

2. The microscope system according to claim 1, further comprising:
   the lens assembly, comprising at least one lens and configured to let the second light generated by the image projection module to pass through before entering the first optical path;
   an eyepiece and a trinocular tube, the eyepiece being sleeved with the trinocular tube and configured to observe the target sample through the objective lens; and
   an image projection assembly, disposed in an optical path corresponding to the second light, and configured to perform image enhancement processing on an image of the target sample,
   the trinocular tube being disposed on one end of the beamsplitter away from the objective lens, the trinocular tube comprising at least two channels and a tube lens, the channels being located on one end away from the beamsplitter, one of the channels being in communication with the eyepiece, and the tube lens being located on one end close to the beamsplitter.

3. The microscope system according to claim 1, wherein the focusing device comprises a drive assembly and a zoom lens, to photograph the target sample in the microscope field of view at different focal lengths.

4. The microscope system according to claim 2, wherein the beamsplitter assembly is respectively in communication with the objective lens and the tube lens of the trinocular tube, and the camera assembly is disposed in one of the channels of the trinocular tube;

the beamsplitter comprises a single beamsplitter, and the lens assembly comprises a lens disposed between the beamsplitter and the image projection assembly; and the focusing device is located between the beamsplitter and the camera assembly and is configured to adjust the focal length of the image light entering the camera assembly according to the defocus amount of the target sample image determined by the auxiliary focusing device.

5. The microscope system according to claim 4, wherein the image projection assembly further comprises a second polarizer, the second polarizer being located between a lens and the beamsplitter and being configured to perform polarization processing on light corresponding to the image projection assembly; and the camera assembly further comprises a first polarizer, the first polarizer being located between the focusing device and the beamsplitter and being configured to perform polarization processing on corresponding light collected by the camera assembly.

6. The microscope system according to claim 4, wherein the auxiliary focusing light source is disposed in a Fourier back focal plane corresponding to a condenser lens assembly of the microscope system and is configured to emit auxiliary focusing light, to form the second optical path;

the beamsplitter is disposed between the focusing device and the camera assembly and is configured to reflect light in the second optical path to the auxiliary focusing camera; and the auxiliary focusing camera is disposed at an axial biasing position on a conjugate plane of the camera assembly and is configured to photograph an overlapped image matching the target sample in the microscope field of view based on the light in the second optical path.

7. The microscope system according to claim 4, wherein the auxiliary focusing light source is disposed in a Fourier back focal plane corresponding to a condenser lens assembly of the microscope system and is configured to emit auxiliary focusing light, to form the second optical path; and the auxiliary focusing camera is disposed opposite to the image projection assembly along the beamsplitter assembly and is configured to photograph an overlapped image matching the target sample in the microscope field of view based on light in the second optical path.

8. The microscope system according to claim 1, wherein the image projection assembly and the camera assembly run in a time division multiplexing mechanism.

9. The microscope system according to claim 1, further comprising:

at least one output interface device, coupled with a data processing unit of the microscope system, to output the clearly focused image photographed through the first optical path and an image of the target sample after image enhancement processing.

10. The microscope system according to claim 1, wherein the objective lens comprises at least one of:

an achromatic objective lens, a planar achromatic objective lens, a planar semi-apochromatic objective lens, or a planar apochromatic objective lens; and the beamsplitter comprises at least one of:

a cube beamsplitter, a plate beamsplitter, or a pellicle beamsplitter.

11. A medical device, comprising:

a microscope system, a memory, and a processor, the microscope system comprising:

an objective lens, configured to gather a first light of a target sample to enter a first optical path, wherein the first light converges, at a beamsplitter, with a second light generated by an image projection module after entering the first optical path through a lens assembly;

a beamsplitter assembly, comprising the beamsplitter and configured to respectively separate and cast lights in different optical paths;

a camera assembly, disposed in the first optical path, comprising a camera, and configured to photograph the target sample in a microscope field of view, to generate and output a focused image photographed through the first optical path;

an auxiliary focusing device, comprising an auxiliary focusing light source and an auxiliary focusing camera, disposed in a second optical path, and configured to determine a focal length matching the camera assembly; and a focusing device, configured to adjust a focal length of image light entering the camera assembly according to a defocus amount of a target sample image determined by the auxiliary focusing device;

the memory being configured to store executable instructions; and the processor being configured to perform:

obtaining a measurement sample photographed by using the auxiliary focusing camera in the second optical path;

calculating an image evaluation parameter according to the measurement sample photographed by the auxiliary focusing camera and an image evaluation standard corresponding to the measurement sample;

searching a prestored calibration curve for a relationship between the image evaluation parameter and a defocus amount according to the image evaluation parameter, to determine a required defocus amount; and adjusting a focal length of the image light entering the camera assembly according to the determined defocus amount, to photograph a clearly focused image by using the camera assembly through the first optical path.

12. The medical device according to claim 11, wherein the obtaining a measurement sample photographed by using an auxiliary focusing camera in a second optical path of the microscope comprises:

collecting light in the second optical path by using the auxiliary focusing camera; and processing the collected light in the second optical path based on a type of the auxiliary focusing camera, to photograph an overlapped image matching a target sample in a microscope field of view.

13. The medical device according to claim 11, further comprising:

photographing the target sample in a microscope field of view by using light in the first optical path based on a result of the adjusting of the focal length, and forming and outputting the clearly focused image photographed through the first optical path.

14. The medical device according to claim 11, wherein the microscope system further comprises:

the lens assembly, comprising at least one lens and configured to let the second light generated by the image projection module to pass through before entering the first optical path;

an eyepiece and a trinocular tube, the eyepiece being sleeved with the trinocular tube and configured to observe the target sample through the objective lens; and an image projection assembly, disposed in an optical path corresponding to the second light, and configured to perform image enhancement processing on an image of the target sample, the trinocular tube being disposed on one end of the beamsplitter away from the objective lens, the trinocular tube comprising at least two channels and a tube lens, the channels being located on one end away from the beamsplitter, one of the channels being in communication with the eyepiece, and the tube lens being located on one end close to the beamsplitter.

15. The medical device according to claim 11, wherein the focusing device comprises a drive assembly and a zoom lens, to photograph the target sample in the microscope field of view at different focal lengths.

16. The medical device according to claim 14, wherein the beamsplitter assembly is respectively in communication with the objective lens and the tube lens of the trinocular tube, and the camera assembly is disposed in one of the channels of the trinocular tube;

the beamsplitter comprises a single beamsplitter, and the lens assembly comprises a lens disposed between the beamsplitter and the image projection assembly; and the focusing device is located between the beamsplitter and the camera assembly and is configured to adjust the focal length of the image light entering the camera assembly according to the defocus amount of the target sample image determined by the auxiliary focusing device.

17. The medical device according to claim 16, wherein the image projection assembly further comprises a second polarizer, the second polarizer being located between a lens and the beamsplitter and being configured to perform polarization processing on light corresponding to the image projection assembly; and the camera assembly further comprises a first polarizer, the first polarizer being located between the focusing device and the beamsplitter and being configured to perform polarization processing on corresponding light collected by the camera assembly.

* * * * *